United States Patent
Park et al.

(10) Patent No.: US 8,840,165 B2
(45) Date of Patent: Sep. 23, 2014

(54) GLOVE BOX FOR VEHICLE

(71) Applicant: Hyundai Motor Company, Seoul (KR)

(72) Inventors: Sung Hae Park, Busan (KR); Yong Chul Kim, Gyeonggi-do (KR); Kwang Ok Han, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/894,654

(22) Filed: May 15, 2013

(65) Prior Publication Data

US 2014/0175824 A1 Jun. 26, 2014

(30) Foreign Application Priority Data

Dec. 21, 2012 (KR) .................. 10-2012-0150327

(51) Int. Cl.
*B60R 7/06* (2006.01)
(52) U.S. Cl.
CPC ......................................... *B60R 7/06* (2013.01)
USPC ....................................................... 296/37.12
(58) Field of Classification Search
USPC ............................................. 296/37.12, 24.3
See application file for complete search history.

(56) References Cited

U.S. PATENT DOCUMENTS

| 6,050,628 | A  | * | 4/2000  | Allison et al. | ............. | 296/37.12 |
| 7,121,605 | B2 | * | 10/2006 | DePue et al.   | ............... | 296/37.12 |
| 8,505,996 | B1 | * | 8/2013  | Shin           | ........................... | 296/37.12 |

FOREIGN PATENT DOCUMENTS

| JP | 2009-006830 A    | 1/2009 |
| KR | 10-0204656 B1    | 6/1999 |
| KR | 20-1999-0021484 U | 6/1999 |
| KR | 10-2005-0008113 A | 1/2005 |

\* cited by examiner

*Primary Examiner* — Lori Lyjak
(74) *Attorney, Agent, or Firm* — Edwards Wildman Palmer LLP; Peter F. Corless

(57) ABSTRACT

Disclosed is a glove box for a vehicle including: an opening formed in an instrument panel; a box-shaped body which is ejectable and retractable through the opening and which is provided with a guide rail and a rack gear, the guide rail including a linear portion linearly extending in a direction in which the box-shaped body moves and a curved portion extending in a curve from an end of the linear portion, the rack gear being formed along one side of the guide rail; and an actuator provided with a pinion gear which meshes with the rack gear, and a drive unit which transfers driving force to the pinion gear.

9 Claims, 7 Drawing Sheets

PRIOR ART

GLOVE BOX FOR VEHICLE

CROSS-REFERENCE TO RELATED APPLICATIONS

This application claims priority under 35 U.S.C. §119 to Korean Patent Application No. 10-2012-0150327, filed on Dec. 21, 2012, in the Korean Intellectual Property Office, the disclosure of which is incorporated herein by reference in its entirety.

BACKGROUND OF THE INVENTION

1. Field of the Invention

The present invention relates to a glove box for a vehicle, particularly to a glove box which rotates in a manner that moves the glovebox towards a driver's seat when the glove box opens.

2. Description of the Related Art

Generally, in the interior of automobiles, an instrument panel is placed in front of the driver. The instrument panel houses gauges, control switches for operation of the vehicle, an audio system, a glove box and the like. The glove box is located on the passenger side of a vehicle, and is conveniently used to store simple items which a driver may wish to access while driving. The glove box is hidden inside the instrument panel when it is closed and is exposed when it is opened by a user's manipulation.

A conventional glove box, e.g. as shown in FIG. 1, includes a body 20 with a storage space 22 therein, which is placed inside an instrument panel 10 and coupled to the instrument panel 10 in a pivoting manner by a hinge structure 30. The glove box is generally installed to face the passenger's seat and moves in a longitudinal direction of the vehicle when it closes and opens. For this reason, the driver must lean in the direction of the passenger's seat to take something out of the glove box. This causes inconvenience to the driver. Furthermore, it is difficult for the driver to keep his or her eyes on the road when the driver leans toward the glove box, and this can lead to a car accident.

In addition, the conventional glove box opens by a user's unlatching of a latching device 24. With the unlatching operation, the body 20 of the glove box is ejected from the instrument panel 10. Because the glove box is structured to open only by the unlatching operation, it is inconvenient for a user seated in the driver's seat to use the glove box.

Therefore, a glove box which can be used more conveniently and more safely by a driver while the driver is seated in the driver's seat has long been desired.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art. The present invention provides a glove box for a vehicle which provides a driver with convenient access without requiring the driver to lean toward the passenger's side. As such, use of the glove box is more convenient and, further, the risk of car accidents is reduced.

According to one aspect of the present invention, there is provided a glove box for a vehicle, including: an opening formed in an instrument panel; a box-shaped body which is retractable through the opening and provided with a guide rail and a rack gear, the guide rail including a linear portion linearly extending in a direction in which the box-shaped body is retractable and a curved portion extending in a curved form from an end of the linear portion, the rack gear being formed along one side of the guide rail; and an actuator provided with a pinion gear which meshes with the rack gear, and a drive unit which transfers driving force to the pinion gear.

According to various embodiments, the guide rail is provided with a slot-like groove extending in a direction in which the guide rail extends. Further, a guide protrusion which is retractable in the slot-like groove may be formed in the opening.

According to various embodiments, the linear portion of the guide rail extends from the opening in the direction in which the box-shaped body is retractable, and the curved portion curves in a direction toward a driver's seat from an end of the linear portion. According to various embodiments, the end of the linear portion from which curved portion extends is relatively far from the opening.

According to various embodiments, the glove box is further provided with a support rail which extends from the opening to a bottom portion of the box-shaped body. Further, a leading end of the support rail is provided at a bottom portion of the box-shaped body, and may be curved along the same curvature as the curved portion of the guide rail.

According to various embodiments, an upper hinge protrusion is provided at an upper end portion of the box-shaped body, a blocking bar corresponding to the upper hinge protrusion is provided in the opening. As such, linear movement of the box-shaped body which moves along the guide rail may be restricted by the blocking bar, and the box-shaped body may rotate about the upper hinge protrusion after the linear movement is restricted.

According to various embodiments, the upper hinge protrusion is located near one side of the curved portion of the guide rail.

According to various embodiments, a lower hinge protrusion is provided at a lower end portion of the box-shaped body, and the blocking bar may extend up to the lower end portion of the box-shaped body so as to correspond to the lower hinge protrusion.

According to various embodiments, the blocking bar is provided with blocking grooves which correspond to the upper and lower hinge protrusions, respectively.

According to various embodiments, the drive unit of the actuator is a motor which performs forward rotation and reverse rotation, and the box-shaped body is ejectable from or retractable into the instrument panel according to a direction of rotation of the pinion gear.

According to various embodiments, a glove box for a vehicle having the structure described above includes a box-shaped body which is ejectable or retractable through an opening formed in an instrument panel, and an actuator configured and arranged for moving the box-shaped body (i.e. for ejecting and retracting the box-shaped body).

According to various embodiments, the box-shaped body is provided with a rack gear formed to extend along a guide rail and the actuator is provided with a pinion gear which meshes with the rack gear. When a rotational force is transferred via a driving unit of the actuator, the box-shaped body moves along the guide rail so as to be ejected or retracted through the opening.

With this structure, the driver can use the glove box without directly opening or closing the glove box (i.e. by simply pressing the actuator to open and close, which is in contrast with conventional latching devices which must manipulated to open and which further require that a user push the glove box and press the latching device into the instrument panel to close).

Moreover, since the guide rail provided for the box-shaped body is shaped to bend in a direction toward the driver's side, the glove box is ejected while pivoting in a direction towards the driver's side. Accordingly, the glove box of the present invention is convenient to use.

Accordingly, the driver's convenience is improved, and the risk of having an automobile accident is reduced.

Other features and aspects of the present invention will be apparent from the following detailed description, drawings and claims.

BRIEF DESCRIPTION OF THE DRAWINGS

The above and other objects, features and other advantages of the present invention will be more clearly understood from the following detailed description when taken in conjunction with the accompanying drawings, in which.

Figure 1:
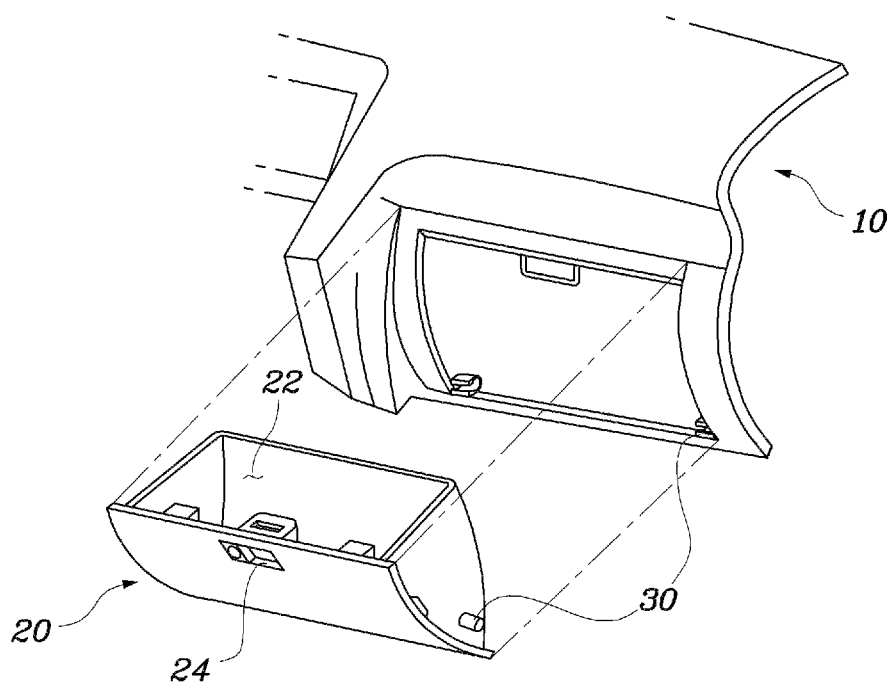
FIG. 1 is a diagram illustrating a conventional glove box.

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment. The specific solar cell type of the invention as disclosed herein will be determined in part by the particular intended application and use environment.

In the figures, reference numerals refer to the same or equivalent parts of the disclosure throughout the several figures of the drawings.

DETAILED DESCRIPTION OF THE INVENTION

Hereinbelow, preferred embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.50%, 0.1%, 0.05%, or 0.01% of the stated value. Unless otherwise clear from the context, all numerical values provided herein are modified by the term "about".

Figure 2:
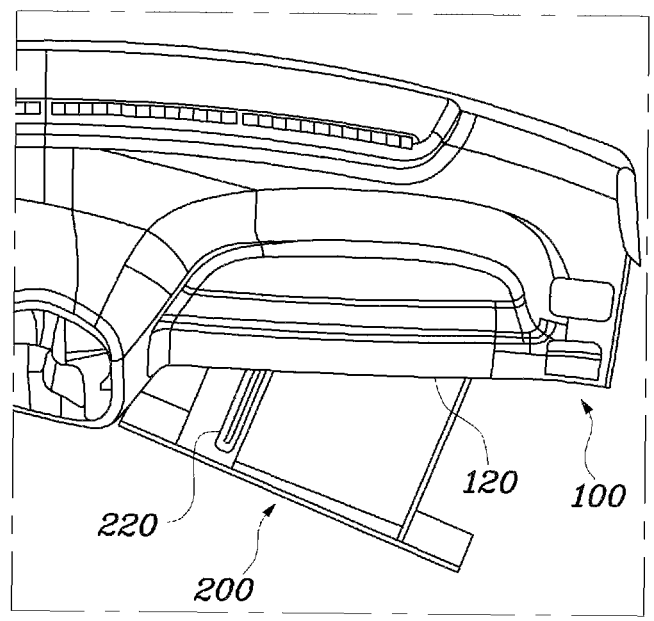
FIG. 2 is a diagram illustrating a glove box for a vehicle according to one embodiment of the present invention.
Figure 3:
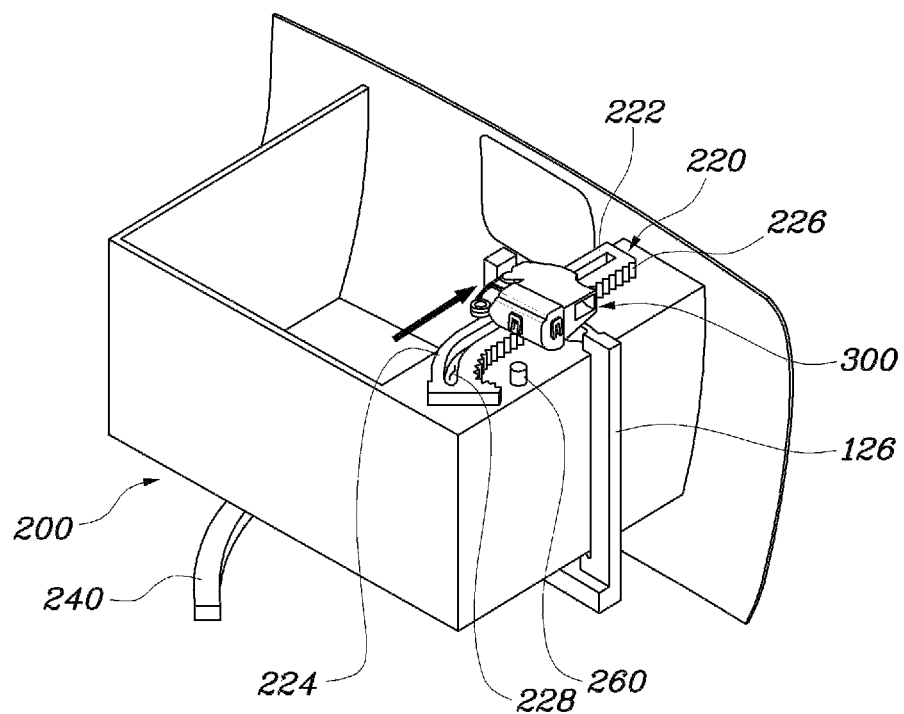
FIGS. 3 and 4 are diagrams illustrating operation of the glove box illustrated in FIG. 2.
Figure 4:
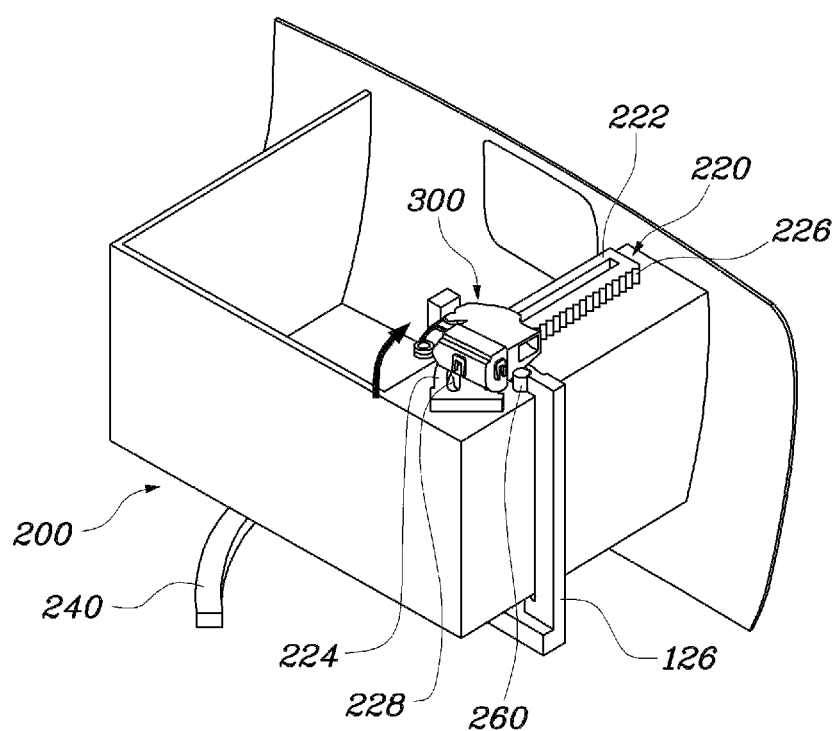
Figure 5:
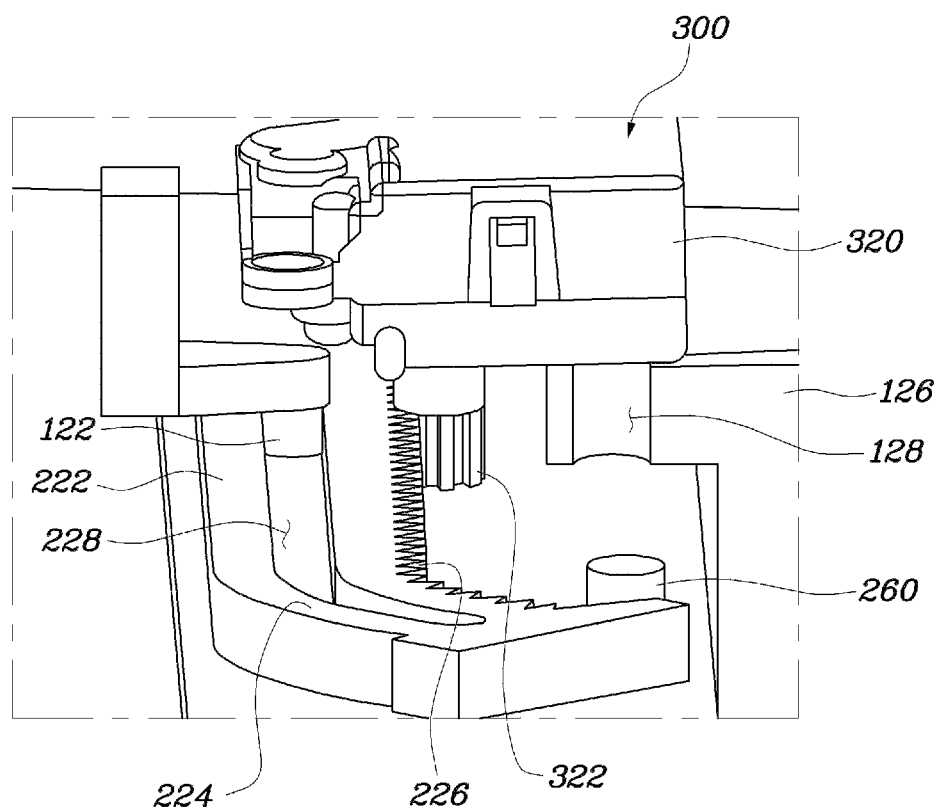
FIG. 5 is a diagram illustrating a guide rail and an actuator of the glove box illustrated in FIG. 2.
Figure 6:
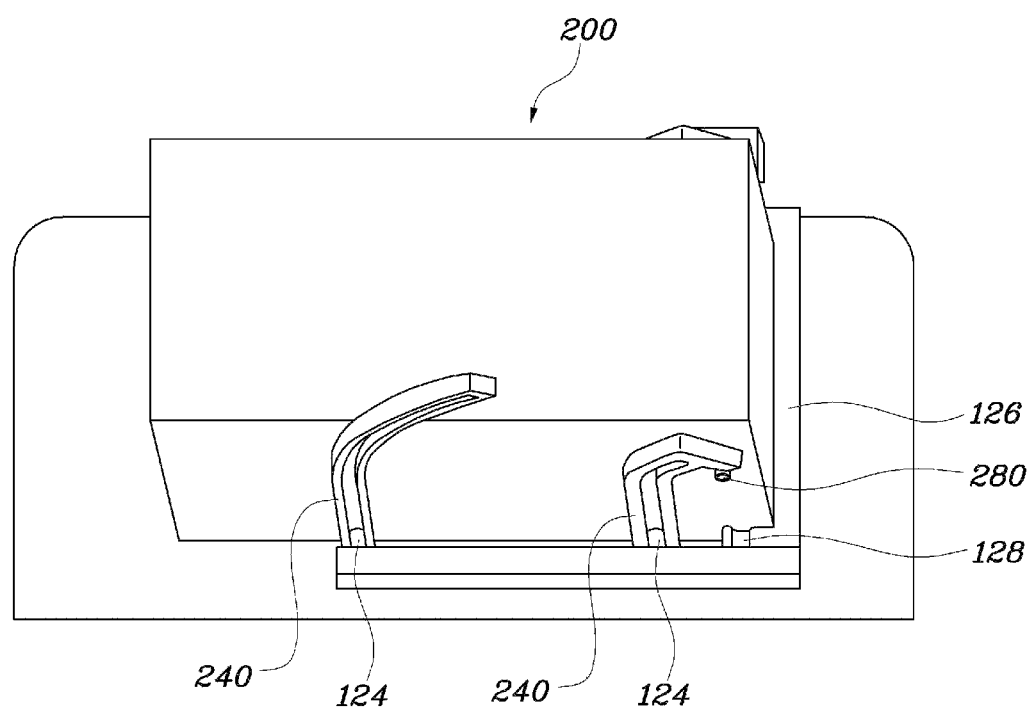
FIG. 6 is a diagram illustrating a lower portion of a box-shaped body of the glove box illustrated in FIG. 2.
Figure 7:
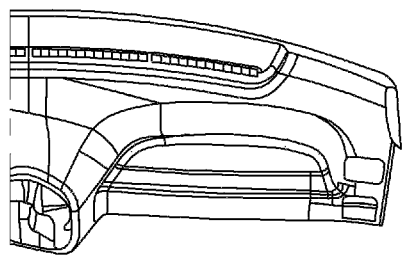
FIG. 7 is a diagram illustrating operation of the glove box according to an embodiment of the present invention.
Figure 7:
Figure 7:
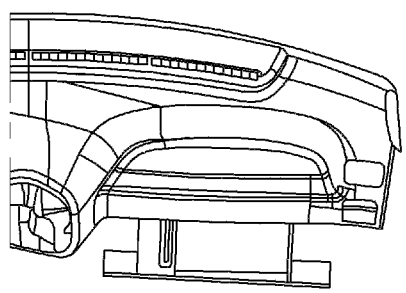
Figure 7:
Figure 7:
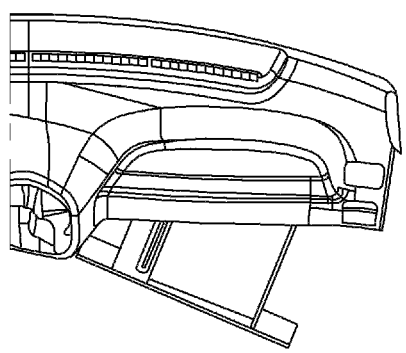

FIG. 2 is a diagram illustrating a glove box for a vehicle according to one embodiment of the present invention, FIGS. 3 and 4 are diagrams illustrating operation of the glove box illustrated in FIG. 2, and FIG. 5 is a diagram illustrating a guide rail and an actuator of the glove box illustrated in FIG. 2. FIG. 6 is a diagram illustrating a lower portion of a box-shaped body of the glove box illustrated in FIG. 2, and FIG. 7 is a diagram illustrating operation of the glove box according to an embodiment of the present invention.

As shown in FIGS. 2-6, an embodiment of a glove box for a vehicle according to the present invention includes: an opening 120 formed in an instrument panel 100; a box-shaped body 200 retracted through the opening 120 and provided with a guide rail 220 and a rack gear 226, the guide rail 220 including a linear portion 222 extending in a direction along which the box-shaped body 200 is ejectable and retractable and a curved portion 224 which extends and curves from an end of the linear portion 222, the rack gear 226 being formed along one side of the guide rail 220; and an actuator 300 including a pinion gear 322 which meshes with the rack gear 226, and a drive unit 320 which transfers rotational force to the pinion gear 322.

According to preferred embodiments, the body 200 is box-like in shape and is referred to herein as a box-shaped body 200. A box-shaped structure is generally understood to mean a three-dimensional shape with rectangularity. However, the structure of the present body is not limited to rectangular structures, and can be, for example, rounded along the corners. In general, the body has a three-dimensional structure with a depth into which items may be disposed.

Since the glove box is located on the passenger side in an instrument panel, it is difficult for a driver to use the glove box while the driver is sitting in the driver's seat. That is, since the distance to the glove box from the driver's seat is far, the driver must lean toward the passenger's side. This is inconvenient to the driver and increases the likelihood of a car accident because the driver is distracted from watching the road while using the glove box.

As illustrated in FIGS. 2 and 7, when the glove box is opened and ejected, the glove box 200 does not move only in the longitudinal direction but also rotates in a manner that approaches the driver's seat so as to solve the problems mentioned above. That is, since the glove box 200 approaches the driver's seat, the driver can more conveniently and safely use the glove box 200.

The structure of the glove box 200 will be described in greater detail below. The glove box 200 includes the box-shaped body 200, which is used to store objects therein, and the actuator 300.

The guide rail 220 extending in the lengthwise direction is installed on the outer surface of the box-shaped body 200. For example, as shown in FIG. 3, the guide rail 220 can be disposed along an upper outer surface of the box-shaped body 200. Alternatively, the guide rail 220 can be disposed along a lower outer surface of the box-shaped body 200 (not shown). As shown, the guide rail 220 includes the linear portion 222 and the curved portion 224 which extends continuously from an end of the linear portion 222. When the box-shaped body 220 is ejected from the instrument panel 100, the guide rail 220 guides the box-shaped body 200 outwards (i.e. away from the instrument panel 100) and towards the driver's seat. The box-shaped body 200 moves along the linear portion 222 of the guide rail 220 so as to be ejected linearly at an early stage of ejection of the box-shaped body 200, and after that, moves along the curved portion 224 of the guide rail 220 so as to perform rotational motion toward the driver's seat.

Here, the opening 120 means the inside of the instrument panel and is not necessarily limited to a portion of the instrument panel which becomes open and closed by ejection and retraction of the box-shaped body 200.

More specifically speaking, the linear portion 222 of the guide rail 220 extends from the opening 120 in a direction along which the box-shaped body 200 is retracted and ejected, and the curved portion 224 extends and curves from an end, at a distal end from the opening 120, of the linear portion 222 and toward the driver's seat.

That is, the box-shaped body 200 is ejected sufficiently away from the instrument panel 100 so as to be exposed to the outside (i.e. so that an interior volume thereof is exposed) after moving along the linear portion 222 of the guide rail 220, and then rotated toward the driver's seat by movement along the linear portion 222 and then the curved portion 224 of the guide rail 220. As a result, the driver in the driver's seat can easily, conveniently and safely use the glove box.

Preferably, as depicted in FIG. 2, the guide rail 220 is installed at a portion of the box-shaped body 200 which is nearer to the driver's seat, and more preferably the guide rail 220 is located at an upper end or a lower end of the box-shaped body 200.

The effect of the present invention may be attained regardless of the location where the guide rail 220 is provided for the box-shaped body 200. However, it is preferable that the guide rail 220 is positioned such that the distance between the rotational center of the box-shaped body 200 and the driver's seat is low. Such a position is more preferable due to the resulting the larger radius of gyration. In particular, the closer guide rail 220 is to the driver's seat as, the larger the radius of gyration at which the box-shaped body 200 may rotate toward the driver's seat.

In addition, due to the many circuits provided for performing various functions, which may be installed on both sides of the box-shaped body 200 in the instrument panel 100, and due to the structural requirements in the design of a vehicle's body, the locations where the guide rail 220 and additional parts (such as the drive unit 320) are installed may be limited.

In the structure in which the guide rail 220 is installed closest to the driver's seat, the length of the guide rail 220 is reduced, the radius of gyration of the box-shaped body 200 is increased, and the limitation with respect to the location for installation is removed.

AS further shown in FIGS. 3-5, the rack gear 226 is formed along one side of the guide rail 220. The actuator 300 includes the pinion gear 322 which meshes with the rack gear 226, and the drive unit 320 which transfers the rotational force to the pinion gear 322.

That is, since the rack gear 226 is formed along one side of the guide rail 220, and the drive unit 320 is combined with the pinion gear 322 which meshes with the rack gear 226, the rotational force from the drive unit 320 is transferred as a linear force to the rack gear 226 via the pinion gear 322. This allows the rack gear 226 to perform linear movement. In this way, the box-shaped body 200 slides in and out of the opening 120.

Further, the guide rail 220 and the drive unit 320 have a rack and pinion structure which generates less friction and efficiently transfers driving force. With this structure, the box-shaped body 200 can be stably ejected and retracted by the rotational force transferred from the drive unit 320.

As shown in FIGS. 3-5, a slot-like groove 228 is formed in the guide rail 220 in a manner that extends along the direction along which the guide rail 220 extends. A guide protrusion 122 (see FIG. 5) may be installed in the opening 120 so as to be retracted into a portion of the slot-like groove 228.

This structure enables the box-shaped body 200 to perform linear movement and rotational movement. The slot-like groove 228 is formed to extend along the direction in which the guide rail 220 extends, and the guide protrusion 122, which is retracted in the slot-like groove 228, is provided in the opening 120.

In a state in which the rack gear 226 formed along one side of the guide rail 220 and the pinion gear 322 connected to the drive unit 320 mesh with each other, the box-shaped body 200 is ejected and retracted by the rotational force of the drive unit 320. At this time, since the guide protrusion 122 is retracted in the opening 120 and the slot-like groove 228, the box-shaped body 200 is able to move along the guide rail 220, and the mesh between the pinion gear 322 and the rack gear 226 can be maintained.

When the box-shaped body 200 is ejected by a predetermined extent, the movement of the box-shaped body 200 is restricted by the guide protrusion 122 and the slot-like groove 228. That is, the guide protrusion 122 prevents the box-shaped body 200 from slipping off the opening 120.

That is, since the guide protrusion 122, which is formed in the opening 120, is retracted and fixed in the slot-like groove 228, when the driving force is transferred from the drive unit 320 to the actuator 300, the box-shaped body 200 can stably move along the guide rail 220.

In addition, as illustrated in FIG. 6, a support rail 240 can further extend from the opening 120 in a direction in which the box-shaped body 200 is retracted and ejected, and has an end portion provided underneath the box-shaped body 200. The end portion of the support rail 240 preferably has the same curvature as the curved portion 224 of the guide rail 220. A support protrusion 124 may be provided to be retractable in a portion of the support rail 240 which is near the opening 120.

The support rail 240 prevents the box-shaped body 200 from being decoupled from the instrument panel 100, supports the box-shaped body 200 so that the box-shaped body 200 may stay in the opening 120, and assists in enabling smooth movement of the box-shaped body 200.

The number of the support rails 240 provided underneath the box-shaped body 200 is not particularly limited, and a plurality may be provided so that the box-shaped body 200 may be more stably supported in the opening 120 even when heavy items are stored in the box-shaped body 200.

According to the present invention, the box-shaped body 200 is ejected by a predetermined length by movement along the linear portion 222 of the guide rail 220, and then rotated by movement along the curved portion 224 of the guide rail 220. Accordingly, with the support rail 240 having the same curvature of the curved portion 224 of the guide rail 220, the box-shaped body 200 can more stably move along the guide rail 220 and the support rail 240.

In addition, as illustrated in FIGS. 5 and 6, an upper end portion of the box-shaped body 200 can be provided with an upper hinge protrusion 260, and a blocking bar 126 corresponding to the hinge protrusion 260 can be formed in the opening 120. As the box-shaped body 200 moves along the guide rail 220, it eventually bumps into the blocking bar 126 and after that rotates about the hinge protrusion 260. The hinge protrusion 260 is located in the vicinity of one side of the curved portion 224 of the guide rail 220.

In addition, a lower hinge protrusion 280 can be provided on the bottom of the box-shaped body 200, and the blocking bar 126 may extend to the bottom of the box-shaped body 200 so as to correspond to the lower hinge protrusion 280.

The blocking bar 126 may be provided with latching grooves 128 corresponding to the hinge protrusions 260 and 280 formed at the upper end portion and the lower end portion of the box-shaped body 200, respectively.

In order for the box-shaped body 200 to rotate toward the driver's seat, the upper hinge protrusion 260 and the lower hinge protrusion 280 are preferably formed at one side of the box-shaped body 200 so that the box-shaped body 200 can rotate about the hinge protrusions 260 and 280. Since the box-shaped body 200 rotates along the curved portion 224 of the guide rail 220, the upper hinge protrusion 260 is preferably installed near one side of the curved portion 224 of the guide rail 220. With this configuration, the box-shaped body 200 can rotate by the curved portion 224 of the guide rail 220 and the hinge protrusions 260, 280.

However, since the blocking bar 126 corresponding to the hinge protrusion is formed in the opening 120, when the box-shaped body 200 is ejected, the hinge protrusion 126 bumps into the blocking bar 126 after the box-shaped body 200 linearly moves a predetermined length, thereby restricting movement of the box-shaped body 200. Thereafter, the box-shaped body 200 rotates about the hinge protrusions 260, 280 after the linear movement is restricted.

It is preferable that the upper end portion of the box-shaped body 200 is provided with the upper hinge protrusion 260 and the lower end portion of the box-shaped body 200 is provided with the lower hinge protrusion 260. If only one of the upper end or the lower end of the box-shaped body 200 is provided with the hinge protrusions 260 or 280, when the linear movement of the box-shaped body 200 is restricted by the blocking bar 126, the box-shaped body is likely to twist upward or downward and, as a result, the smooth rotational motion may not be attained.

For this reason, the blocking bar 126 is preferably formed to extend from the upper end to the lower end of the box-shaped body 200 so as to correspond to both of the upper hinge protrusion 260 and the lower hinge protrusion 280. With this structure, when the box-shaped body 200 is ejected, the hinge protrusions 260 and 280 come into contact with the blocking bar 126. Alternatively, the blocking bar 126 may have a different structure. For example, instead of the structure in which the blocking bar 120 extends from the upper end portion to the lower end portion of the box-shaped body 200, a plurality of blocking bars 126 may be provided in a manner to correspond to the hinge protrusions 260 and 280, respectively in the opening 120.

The blocking bar 126 may be provided with the latching grooves 128 corresponding to the hinge protrusions 260 and 280, respectively. Since the blocking bar 126 is provided with the latching grooves 128 corresponding to the hinge protrusions 260 and 280, when the box-shaped body 200 is ejected and the hinge protrusions 260 and 280 come into contact with the blocking bar 126, the box-shaped body 200 can smoothly rotate because of the latching grooves 128.

That is, during ejection of the box-shaped body 200, the movement of the box-shaped body 200 is restricted by the hinge protrusions 260 and 280 which enter the latching grooves 128, respectively. Since the rotational motion is made in a state in which the hinge protrusions 260 and 280 are received in the latching grooves 128, the box-shaped body 200 can smoothly and stably rotate.

In addition, according to various embodiments, the drive unit 320 of the actuator 300 is a motor which can perform forward rotation and reverse rotation, and enables the box-shaped body 200 to be ejected and retracted with the rotational direction of the pinion gear 322.

As the drive unit 320 of the actuator 300, a reversible motor which can perform forward rotation and reverse rotation is preferably used to cause the box-shaped body 200 to be ejected and retracted according to a user's operation. That is, the direction of the movement of the box-shaped body 200 along the guide rail 220 is changed depending on the direction of rotation of the pinion gear 322 which meshes with the rack gear 226 of the guide rail 220.

An operation switch for operating the drive unit 320 of the actuator 300 is provided inside the vehicle, preferably at a location where the operation switch can be easily operated by a driver sitting in the driver's seat. Accordingly, with a simple manipulation of the operation switch by the driver who is sitting in the driver's seat, the drive unit 320 is actuated and the box-shaped body 200 is ejected to rotates towards the driver's seat.

The operation switch may be located anywhere as long as the driver can easily operate it. As a system which operates the drive unit 320, any conventional systems may be used.

As illustrated in FIG. 7, the glove box of the invention moves to rotate and approach the driver's seat when it opens. Accordingly, the glove box provides a driver with improved convenience, and further reduces the likelihood of accidents from occurring while a driver is using the glove box. Furthermore, since the box-shaped body 200 is ejected and retracted by the driving force from the drive unit 320, the driver can conveniently use the glove box without having to physically eject or retract the box-shaped body 200.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A glove box for a vehicle, comprising:
   an opening formed in an instrument panel;
   a box-shaped body which is ejectable and retractable through the opening;
   a guide rail and a rack gear in connection with the box shaped body, the guide rail including a linear portion linearly extending in a direction in which the box-shaped body is ejectable and retractable and a curved portion extending in a curved form from an end of the linear portion, the rack gear being formed along one side of the guide rail; and
   an actuator provided with a pinion gear, the pinion gear engaging with the rack gear, and a drive unit in connection with the pinion gear so as to transfer driving force to the pinion gear.

2. The glove box for a vehicle according to claim 1, wherein the guide rail is provided with a slot-like groove extending in a direction in which the guide rail extends, and a guide protrusion which is retractable in the slot-like groove disposed in the opening.

3. The grove box for a vehicle according to claim 1, wherein the linear portion of the guide rail extends from the opening in the direction in which the box-shaped body is ejectable and retractable, and the curved portion curves toward a driver's seat from an end of the linear portion.

4. The glove box for a vehicle according to claim 1, further comprising a support rail which extends from the opening along a bottom portion of the box-shaped body, wherein a leading end of the support rail which is provided at the bottom portion of the box-shaped body is curved at the same curvature as the curved portion of the guide rail.

5. The glove box for a vehicle according to claim 1, wherein an upper hinge protrusion is provided at an upper end portion of the box-shaped body, and a blocking bar corresponding to the upper hinge protrusion is provided in the opening, wherein linear movement of the box-shaped body s along the guide rail is restricted by the blocking bar, and wherein the box-shaped body rotates about the upper hinge protrusion after the linear movement is restricted.

6. The glove box for a vehicle according to claim 5, wherein the upper hinge protrusion is located near one side of the curved portion of the guide rail.

7. The glove box for a vehicle according to claim 6, wherein a lower hinge protrusion is provided at the lower end portion of the box-shaped body, and the blocking bar extends to the lower end portion of the box-shaped body so as to correspond to the lower hinge protrusion.

8. The glove box for a vehicle according to claim 7, wherein the blocking bar is provided with blocking grooves positioned to correspond to the upper and lower hinge protrusions, respectively.

9. The glove box for a vehicle according to claim 1, wherein the drive unit of the actuator is a motor which performs forward rotation and reverse rotation, and the box-shaped body is ejectable from and retractable into the instrument panel according to a direction of rotation of the pinion gear.

* * * * *